Figure 1:
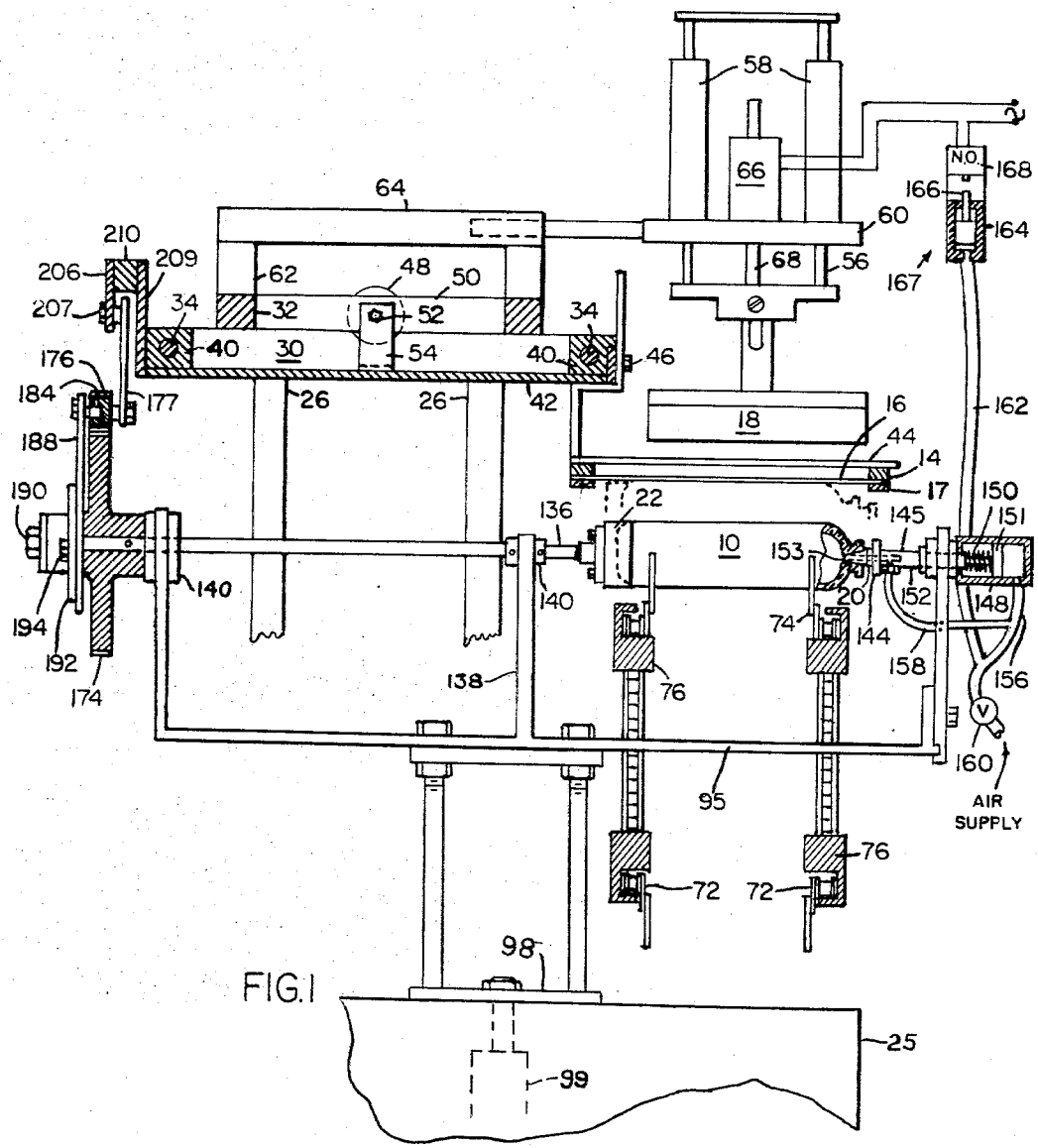

May 3, 1966   W. M. KARLYN   3,249,044
AUTOMATIC STENCILLING MACHINE WITH SMEAR PREVENTING MEANS
Filed April 6, 1965                    2 Sheets-Sheet 1

INVENTOR
WILLIAM M. KARLYN
BY,
Kenway, Jenney & Hildreth
ATTORNEYS

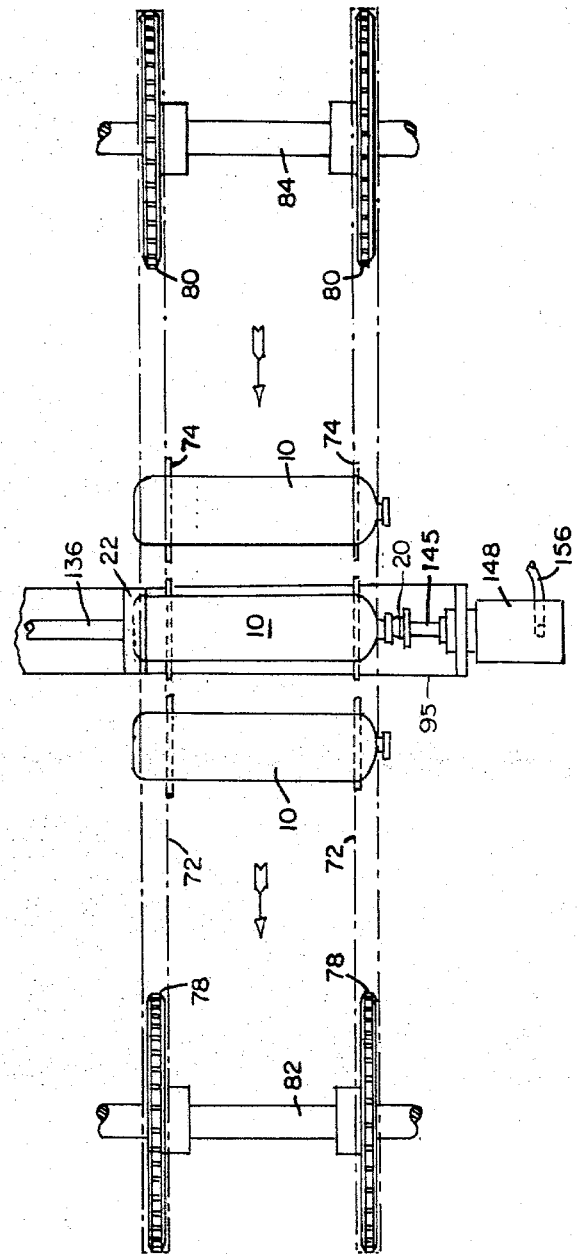

United States Patent Office 3,249,044
Patented May 3, 1966

3,249,044
AUTOMATIC STENCILLING MACHINE WITH
SMEAR PREVENTING MEANS
William M. Karlyn, 18 Merritt St., Marblehead, Mass.
Filed Apr. 6, 1965, Ser. No. 446,043
5 Claims. (Cl. 101—38)

This invention relates to automatic stencilling apparatus, and more particularly to improved apparatus for preventing smearing of articles which are fed sequentially by a conveyor to the stencilling apparatus.

A stencilling apparatus of the type with which the present invention is concerned generally includes chuck means for gripping each successive article and supporting it against a lower surface of a silk screen; a squeegee which is pressed against the opposite face of the screen for forcing paint through openings forming a design; means for translating the screen and squeegee relative to one another to transfer the design; and conveyor means for delivering a series of articles to and from the chuck. As the stencilling of each article is completed, it is returned by the chuck to the conveyor for delivery, and the chuck picks up a subsequent article from the conveyor.

The conveyor has a series of forks or other holders in which the articles are loaded, either manually or by automatic means; and the conveyor is indexed in discrete steps to deliver the successive articles to a pick-up station where they can be gripped by the chuck. It may often occur that some of the holding means are not loaded with articles, especially when the conveyor is loaded manually, but the apparatus passes through its automatic cycle nevertheless. In the absence of an article bearing against the surface of the screen, the squeegee still forces the marking ink or paint through the stencil design, and a smear of unabsorbed paint spreads over the lower screen surface. Subsequently-treated articles are consequently smeared with paint. Large numbers of articles are sometimes spoiled in this way.

It is the general object of the present invention to prevent this damaging occurrence. It is a more specific object to provide an improved stencilling apparatus having means for preventing a relative translation in surface contact between the squeegee and screen, except when there is an article pressed against the opposite surface of the screen to receive the paint squeezed through the stencil. It is a further object to provide an improved stencilling apparatus which insures better control of the quality and uniformity of the product. It is another object to provide an improved control of the stencilling action according to the presence or absence of an article in the chuck. Further objects and advantages of the invention will appear as the following description proceeds.

I may carry out my invention in connection with automatic stencilling apparatus of the type which includes a stencilling screen, a squeegee, and means for bringing about relative translation of the squeegee and the screen in mutual surface contact. A conveyor is used to deliver a series of articles sequentially to a pick-up station, at which a chuck is arranged for injection into the mouth or open end of each article, serving to hold the article in stencilling engagement with the lower surface of the screen during the relative translation of the squeegee. After each article is stencilled, it is released by the chuck and returned to the conveyor, which is then indexed to bring a succeeding article into processing position.

According to a preferred embodiment of the invention, the chuck is injected into the mouth of the article by pressure-actuated means, and is shaped to hermetically seal the mouth. The chuck also has a pressure-release orifice which opens into the interior of the article, so that the actuating pressure is released unless an article is present in the chuck. The means for effecting mutual pressure contact and/or relative translation between the squeegee and screen, are controlled by suitable pressure-operated means such as a pressure switch; this switch is connected with the pressure-release orifice of the chuck, and so prevents a stencilling operation from being carried out unless there is an article fixed in the chuck. Consequently, it is not possible for the machine to pass through the cycle of stencilling operation when the conveyor presents an empty holder at the pick-up station, that is, when no article is available to be chucked. Therefore, marking fluid or paint cannot be flooded over the lower surface of the stencil by the squeegee to smudge the subsequently-treated articles.

It should be understood that the invention is equally applicable to machines which are adapted for stencilling flat surfaces, in which the squeegee may be moved over a stationary screen, and the article is held stationary; or to machines which are adapted for stencilling curved surfaces, in which the squeegee may be moved into or out of pressure contact with the screen, and is held stationary while the screen is moved over a rotating article.

The invention is also applicable to machines having movable carriages for shifting the chuck from an article pick-up station to a decorating station; as well as to those machines which rely on the formation of the chuck alone to raise the articles from the conveyor into contact with the screen.

While the specification concludes with claims particularly pointing out the subject matter which I regard as my invention, it is believed that a clearer understanding may be gained from the following detailed description of a preferred embodiment thereof, referring to the accompanying drawings, in which:

FIG. 1 is a fragmentary sectional view in end elevation showing a preferred embodiment of the improved stencilling mechanism; and FIG. 2 is a fragmentary plan view showing conveyor and chuck elements of the mechanism.

While the invention is applicable to the stencilling of various open-ended articles having flat or curved surfaces to be decorated, a bottle 10 of flexible plastic is illustrated, having a mouth opening 12. The exterior surface of the article is of circular cylindrical form in this case. The improved automatic stencilling apparatus includes a frame 14 arranged to support a silk screen 16 mounted in a base 17; a rubber squeegee 18 for engagement with an upper surface of the silk screen; and a two-part chuck comprising an inflation nozzle 20 and a recessed cup 22, for gripping successive articles and supporting them rotatably in engagement with the lower surface of the screen, in vertical alignment with the squeegee.

The apparatus is organized about a supporting structure 25 which is only partially shown in the drawing, and includes vertical standards 26, horizontal transverse braces 30, and longitudinal braces 32. A pair of cylindrical guide rods 34 are secured in their opposite ends in the braces 30, for slidably supporting the screen frame 14 for reciprocation in a direction normal to the plane of FIG. 1.

The screen frame is supported cantilever-fashion by a sliding assembly which includes a pair of slide bars 40 mounted for reciprocation on the guide rods 34, a base plate 42 connecting the slide bars, and a pair of cantilever arms 44 secured by screws 46. Reciprocatory movement of the frame and its supporting assembly is obtained by means of a double-acting pneumatic motor 48, mounted on the braces 32 by a transverse bar 50, and having its piston rod 52 connected to the sliding assembly by means of a bracket 54.

The squeegee 18 is of a conventional type, and is mounted by means of a yoke 56 of rectangular form for reciprocation in a pair of bearing housings 58, which may contain ball bushings (not shown) for maintaining proper alignment of the squeegee. The housings are mounted on the supporting structure by means of a cantilever bracket 60 and a framework comprising bars 62 and 64. The plunger 68 of a spring-return solenoid actuator 66 is secured to the yoke 56 for reciprocation of the squeegee to and from pressure engagement with the upper surface of the screen 16.

A series of the articles 10 are carried in the direction shown by the arrows in FIG. 2 to and from a pick-up station aligned vertically beneath the squeegee, by means of a double chain conveyor 72, each chain of which carries a series of V-shaped forks 74 for supporting the series of articles in aligned relationship. Channeled guides 76 are provided to maintain proper alignment of the linear runs of the chains; the chains are driven by pairs of sprockets 78 and 80, which are mounted on a drive shaft 82 and an idler shaft 84, respectively. The conveyor is driven in discrete indexing steps to bring each successive article to the pick-up station for stencilling, and subsequent removal for delivery. Various well known mechanisms may be utilized for this purpose, and no further detailed description thereof is believed necessary.

For automatically stencilling the successive articles, it is necessary to raise each article from the pick-up station into pressure contact with the screen surface, to support it in rolling engagement therewith during the translation of the screen, and then to restore it to the conveyor. This is accomplished by mounting the chuck elements 20, 22 in a carriage 95, which is vertically reciprocable to raise and lower the chuck and an article mounted therein. The carriage is mounted on a yoke 98, which is reciprocable by a suitable actuating motor 99 mounted in the supporting structure of the machine.

The cup 22 is rotatably supported on the carriage by means of a spindle 136, mounted on standards 138 by bearing units 140. The bottle 10 is rotatably supported at its mouth end by means of the nozzle 20, which is rotatably supported by a bearing unit 144 on a shaft 145. The shaft 145 is reciprocable along the axis of the bottle by the piston 151 of a single-acting pneumatic motor 148, having a return spring 150. The motor 148 is supplied with pressure fluid by a conduit 156 having a solenoid valve 160, which is controlled to actuate the chuck as the carriage 95 reaches its pick-up position and the conveyor halts to position an article at the pick-up station. The control means, which are not illustrated, may be as shown in my copending application S.N. 391,249, filed August 21, 1964, and entitled "Automatic Stencilling Apparatus for Open-Ended Articles."

A pressure-release orifice 153 is formed in the tip of the nozzle 20 to communicate the interior of the bottle 10 with the air supply, through a branch conduit 158 and a passage 152 drilled in the shaft 145. Consequently, the application of air pressure to the motor 148 also serves to inflate the flexible bottle 10. However, if no bottle is available on the conveyor at the pick-up station for engagement by the chuck, the air pressure may escape through the orifice 153. The orifice is made sufficiently small that the pressure does not, however, escape at a rate great enough to prevent the extension of the shaft 145 and nozzle 20, whether or not a bottle is present in the pick-up station, for otherwise no actuation of the chuck could be obtained.

A second branch conduit 162 supplies a pressure-responsive switch unit 167, comprising a cylinder 164 having a plunger 166, for closing a normally-open microswitch 168 when pressure is applied. The plunger is returned by gravity when the pressure is relieved, to open the circuit to the solenoid actuator 66. Consequently, opening of the valve 160 will, in the absence of an article at the pick-up station, extend the nozzle 20 but fail to close the switch 168; and thus normal pressure engagement between the squeegee and screen is blocked. If an article is available to be picked up, however, the pressure in the conduit 162 is immediately established at a level sufficient to raise the plunger 166 and actuate the solenoid 66.

For rotating the chuck and bottle in synchronism with the screen as the latter translates, a drive pinion 174 is pinned to the spindle 136, and meshed with a rack 176. The rack forms one member of a four-bar parallelogram linkage, including a pair of links 177 and a drive bar 206, pinned by screws 207. The drive bar is affixed to the bars 40 by means of a bracket 209 and a spacer 210. It will be understood that in an alternative form, the bar 206 and spacer 210 may be omitted, and the links 177 secured directly to the bar 40, which then forms one member of the linkage.

In any elevational position of the carriage and bottle, translation of the screen 16 with the bars 40 produces a corresponding translation of the rack and synchronized rotation of the pinion 174 and the bottle. The carriage may at the same time be raised or lowered freely in and out of engagement with the screen, rotating to some extent while translating vertically, but resuming registered relation with the screen as it is brought back into engagement therewith.

The weight of the rack 176 will ordinarily be sufficient to hold it in mesh with the pinion 174, but to insure maintenance of this engagement, the preferred embodiment is provided with a pair of rollers 184 slidably received in a groove or recess formed in the side surface of the rack. The rollers are mounted in a bracket 188, adjustably secured with respect to the spindle 136 by means of a screw 190 mounting the spindle in a bearing unit 192, which is in turn mounted by bolts 194 received in elongated slots formed in the bracket. This apparatus is fully described, and claimed, in my copending application S.N. 341,968, filed February 3, 1964, and entitled "Registering Mechanism for Stencilling Apparatus." By adjusting the mounting of the bearing and spindle with respect to the bracket, drive pinions of various diameters may be accommodated, to adjust the apparatus to different sizes of bottles or other articles.

It should be understood that the invention may be equally applied to other types of automatic stencilling apparatus, with suitable modifications. For example, the relative translation in pressure contact between the squeegee and screen may be effected without lifting the squeegee from the screen at any time; in that case, the pressure-responsive switch 167 would be used to control the actuation of the screen-reciprocating motor 48, instead of the squeegee actuator 66. This alternative is also applicable to the illustrated embodiment. In either case the presence or absence of an article in the chuck controls the leakage of pressure from a conduit which supplies pressure-operated means; and the latter controls the initiation of stencilling cooperation between the squeegee and screen.

While I have illustrated and described a preferred embodiment of my invention by way of illustration, it will be understood by those skilled in the art that various changes and modifications may be made without departing from the true spirit and scope of the invention, which I therefore intend to define in the appended claims without limitation to specific details of the foregoing embodiment.

What I claim is:

1. Apparatus for automatically stencilling a series of open-ended articles, comprising, in combination; a frame adapted to support a stencilling screen; a squeegee; means for effecting a relative translation in mutual contact of said squeegee over an upper surface of the screen, for decorating an article in a decorating station in contact with a lower surface of said screen in opposition to said squeegee, by passing discrete quantities of marking fluid through a stencil design in said screen; such that said relative translation in contact, in the absence of an article at said decorating station, would smear the lower surface of said screen with the marking fluid; conveyor means for bearing successive articles to said decorating station;

a retractable chuck; means for injecting said chuck into the open end of an article in said decorating station; pressure fluid-supply conduit means; said chuck being formed to seal in the open end of an article and having a pressure-release orifice connected for admitting fluid pressure from said conduit means into said article, whereby release of the pressure is prevented only by sealing of said chuck in an article;

actuating means for effecting relative translation of said squeegee and said screen in contact; and control means for selectively energizing said actuating means, including pressure-operated means normally interrupting energization of said actuating means by said control means and operable by fluid pressure to effect such energization; said conduit-forming means connecting said pressure-operated means with said pressure-release orifice;

such that said pressure-operated means are operated to effect relative translation of said screen and squeegee in contact only when said chuck is sealed in an article present in said chuck, thereby preventing smearing of the screen with marking fluid.

2. Apparatus for automatically stencilling a series of open-ended articles, comprising, in combination; a frame adapted to support a stencilling screen; a squeegee; means for effecting a relative translation in mutual contact of said squeegee over an upper surface of the screen, for decorating an article in a decorating station in contact with a lower surface of said screen in opposition to said squeegee, by passing discrete quantities of marking fluid through a stencil design in said screen; such that said relative translation in contact, in the absence of an article at said decorating station, would smear the lower surface of said screen with the marking fluid; conveyor means for bearing successive articles to said decorating station;

a retractable chuck; fluid pressure-actuated means for injecting said chuck into the open end of an article on said conveyor means; conduit-forming means connected to supply pressure to said pressure-actuated means; said chuck being formed to seal in the open end of an article and having a pressure-release orifice connected for admitting the fluid pressure from said conduit-forming means into said article, whereby release of the pressure is prevented only by sealing of said chuck in an article;

actuating means for effecting relative translation of said squeegee and said screen in contact; and control means for selectively energizing said actuating means, including pressure-operated means normally interrupting energization of said actuating means by said control means and operable by fluid pressure to effect such energization; said conduit-forming means connecting said pressure-operated means with said pressure-release orifice;

such that said pressure-operated means are operated to effect relative translation of said screen and squeegee in contact only when said chuck is sealed in an article present in said chuck, thereby preventing smearing of the screen with marking fluid.

3. Apparatus for automatically stencilling a series of open-ended articles, comprising, in combination; a frame adapted to support a stencilling screen; a squeegee; means for effecting a relative translation in mutual contact of said squeegee over an upper surface of the screen, for decorating an article in a decorating station in contact with a lower surface of said screen in opposition to said squeegee, by passing discrete quantities of marking fluid through a stencil design in said screen; such that said relative translation in contact, in the absence of an article at said decorating station, would smear the lower surface of said screen with the marking fluid; conveyor means for bearing successive articles to a pick-up station aligned below said squeegee and spaced from the screen;

a carriage; a retractable chuck mounted in said carriage; pressure-actuated means for injecting said chuck into the open end of an article in said pick-up station; conduit-forming means connected to supply pressure fluid to said pressure-actuated means; said chuck being formed to seal in the open end of an article and having a pressure-release orifice connected for admitting the pressure fluid from said conduit-forming means into said article, whereby release of the pressure is prevented only by sealing of said chuck in an article; means for reciprocating said carriage to transfer an article supported in said chuck between said pick-up station and said decorating station;

actuating means for effecting relative translation of said squeegee and said screen in contact; and control means for selectively energizing said actuating means, including pressure-operated means normally interrupting energization of said actuating means by said control means and operable by fluid pressure to effect such energization; said conduit-forming means connecting said pressure-operated means with said pressure-release orifice;

such that said pressure-operated means are operated to effect relative translation of said screen and squeegee in contact only when said chuck is sealed in an article present in said chuck, thereby preventing smearing of the screen with marking fluid.

4. Apparatus for automatically stencilling a series of open-ended articles, comprising, in combination; a frame adapted to support a stencilling screen; a squeegee; a first actuator for translating said frame, and a second actuator for pressing said squeegee against said screen or retracting said squeegee, for decorating an article in a decorating station in contact with a lower surface of said screen in opposition to said squeegee, by passing discrete quantities of marking fluid through a stencil design in said screen; such that translation of said frame in contact with said screen, in the absence of an article at said decorating station, would smear the lower surface of said screen with the marking fluid; conveyor means for bearing successive articles to said decorating station;

a retractable chuck including a nozzle; means for injecting said nozzle into the open end of an article in said decorating station; pressure fluid-supply conduit means; said nozzle being formed to seal in the open end of an article and having a pressure-release orifice connected for admitting fluid pressure from said conduit means into said article, whereby release of pressure fluid is prevented only by sealing of said nozzle in an article;

and control means for selectively energizing said actuating means, including pressure-operated means normally interrupting energization of at least one of said actuating means by said control means and operable by fluid pressure to effect such energization; said conduit-forming means connecting said pressure-operated means with said pressure-release orifice;

such that said pressure-operated means are operated to effect relative translation of said screen and squeegee in contact only when said nozzle is sealed in an article present in said chuck, thereby preventing smearing of the screen with marking fluid.

5. Apparatus for automatically decorating a series of open-ended articles, comprising, in combination; selectively-operable means for decorating an article in a decorating station by applying discrete quantities of marking fluid thereto in a predetermined pattern, such that operation of said decorating means in the absence of an article at said decorating station, would smear said decorating means with the marking fluid; conveyor means for bearing successive articles to a pick-up station;
a retractable chuck; means for injecting said chuck into the open end of an article in said pick-up station; pressure fluid-supply conduit means; said chuck being formed to seal in the open end of an article and having a pressure-release orifice connected for admitting fluid pressure from said conduit means into said article, whereby release of the pressure is prevented only by sealing of said chuck in an article;
actuating means for effecting operation of said decorating means; and control means for selectively energizing said actuating means, including pressure operated means normally interrupting energization of said actuating means by said control means and operable by fluid pressure to effect such energization; said conduit-forming means connecting said pressure-operated means with said pressure-release orifice;
such that said pressure-operated means are operated to effect operation of said decorating means only when said chuck is sealed in an article present in said chuck, thereby preventing smearing of said decorating means and of subsequently-decorated articles with marking fluid.

References Cited by the Examiner

UNITED STATES PATENTS

| | | | |
|---|---|---|---|
| 2,174,298 | 9/1939 | Whisner | 101—124 |
| 3,172,357 | 3/1965 | Rudolph et al. | 101—126 |

ROBERT E. PULFREY, *Primary Examiner.*